United States Patent
Okasaka (10) Patent No.: US 7,695,195 B2
(45) Date of Patent: Apr. 13, 2010

(54) BEARING APPARATUS FOR A WHEEL OF VEHICLE

(75) Inventor: Makoto Okasaka, Shizuoka-ken (JP)

(73) Assignee: NTN Corporation (JP)

( * ) Notice: Subject to any disclaimer, the term of this patent is extended or adjusted under 35 U.S.C. 154(b) by 769 days.

(21) Appl. No.: 11/021,580

(22) Filed: Dec. 23, 2004

(65) Prior Publication Data

US 2005/0141798 A1    Jun. 30, 2005

(30) Foreign Application Priority Data

Dec. 25, 2003   (JP) ............................. 2003-429722

(51) Int. Cl.
*F16C 13/00* (2006.01)
*F16C 35/00* (2006.01)

(52) U.S. Cl. ...................................... 384/544; 384/589

(58) Field of Classification Search ................. 384/544, 384/589, 542, 625
See application file for complete search history.

(56) References Cited

U.S. PATENT DOCUMENTS

| 2,213,241 A | * | 9/1940 | Denneen et al. ............. 148/572 |
| 3,655,466 A | * | 4/1972 | Ostrovsky et al. ........... 148/567 |
| 5,853,250 A | * | 12/1998 | Krude et al. ................. 384/544 |
| 6,193,820 B1 | * | 2/2001 | Girardello et al. ........... 148/639 |
| 6,280,096 B1 | * | 8/2001 | Miyazaki et al. ............ 384/544 |
| 6,773,165 B2 | * | 8/2004 | Ozawa et al. ............... 384/544 |
| 6,969,201 B2 | * | 11/2005 | Tajima ........................ 384/544 |
| 7,004,637 B1 | * | 2/2006 | Uyama et al. ............... 384/544 |

FOREIGN PATENT DOCUMENTS

JP    2002-87008    3/2002

OTHER PUBLICATIONS

Avallone, et al. Marks' Standard Handbook for Mechanical Engineers, 1996, McGraw-Hill, 10th ed. p. 6-17.*

* cited by examiner

*Primary Examiner*—Thomas R Hannon
*Assistant Examiner*—Justin Krause
(74) *Attorney, Agent, or Firm*—Harness, Dickey & Pierce, P.L.C.

(57) ABSTRACT

A vehicle wheel bearing apparatus which can increase the strength and durability of the wheel hub under rotary bending condition as well as can reduce its weight without changing the configuration and dimension of the wheel mounting flange and without causing surface run-out has an outer member formed with double row outer raceway surfaces on its inner peripheral surface. An inner member is formed with double row inner raceway surfaces arranged opposite to the double row outer raceway surfaces. Double row rolling elements are freely rollable between the outer and inner raceway surfaces respectively of the outer and inner members. A wheel mounting flange is integrally formed with either one of the outer or inner members. At least one of the outer or inner members has threaded apertures to receive hub bolts to secure a wheel. At least one of the outer or inner members formed with the wheel mounting flange which is heat treated to have a predetermined surface hardness. The raceway surfaces are hardened by quenching to a predetermined surface hardness.

15 Claims, 6 Drawing Sheets

PRIOR ART

Fig. 6

PRIOR ART

BEARING APPARATUS FOR A WHEEL OF
VEHICLE

CROSS-REFERENCE TO RELATED APPLICATION

This application claims priority to Japanese Patent Application No. 2003-429722, filed Dec. 25, 2003, which application is herein expressly incorporated by reference.

FIELD OF THE INVENTION

The present invention relates to a vehicle wheel bearing apparatus for supporting the wheel of a vehicle such as an automobile and, more particularly, to a vehicle wheel bearing apparatus having a wheel hub with improved strength and durability under rotary bending conditions.

BACKGROUND OF THE INVENTION

Figure 6:
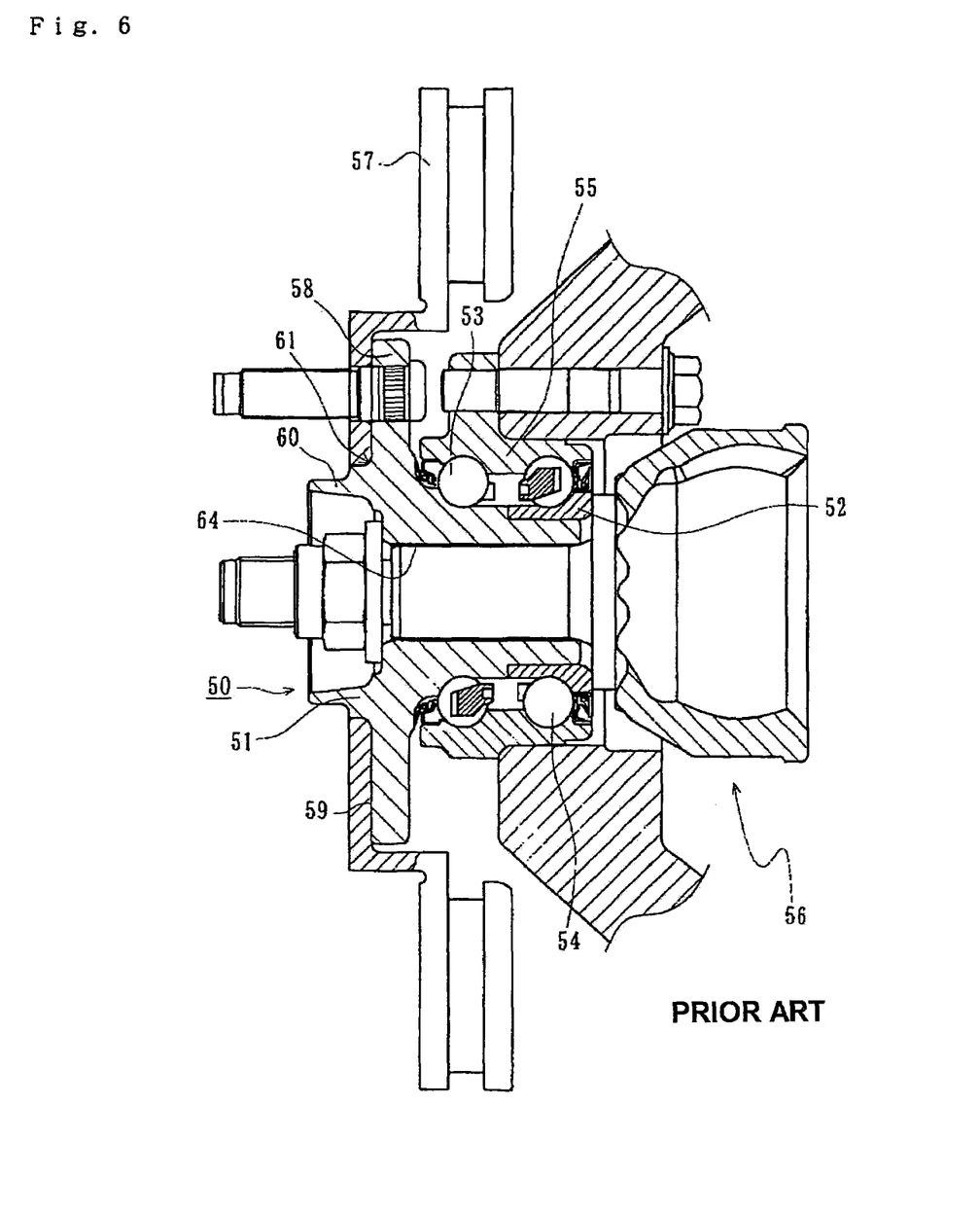
FIG. 6 is a longitudinal section view of another prior art wheel bearing apparatus.

The vehicle wheel bearing apparatus includes various types in accordance with applications for a driven wheel as well as a driving wheel. For example, a conventional bearing apparatus for a driving wheel is shown in FIG. 6. The bearing apparatus has an inner member 50 including a wheel hub 51 and an inner ring 52; double row rolling elements 53 and 54; an outer member 55; and a constant velocity universal joint 56 to transmit an engine output to the wheel hub 51. In a driving wheel bearing apparatus, the wheel hub 51 for supporting a wheel (not shown) and a brake rotor 57 is made of medium carbon steel for machine structures, such as S53C, in view of its ease of forging, cutting and heat treatment, and economy in production. The wheel hub 51 and a wheel mounting flange 58 have been ribbed and thinned to reduce their size and weight to improve fuel consumption as well as driving stability. However since the mechanical strength of such a miniaturized wheel hub 51 itself nears the fatigue limit of the medium carbon steel forming the wheel hub 51, it is difficult to further proceed with the miniaturization and reduction of weight of the wheel hub 51.

In the wheel hub 51 where the wheel mounting flange 58 is thinned for weigh reduction purposes, a special countermeasure is required to deal with the concentration of rotary bending stress at the base portion of the outboard side, namely, at a corner 61 extending from a brake rotor mounting surface 59 toward a cylindrical pilot portion 60. Although it is possible to reduce the generated stress by enlarging the dimension of the corner 61, i.e. the radius of curvature, it is also limited by interference due to the brake rotor 57 being mounted on the wheel mounting flange 58.

Figure 5:
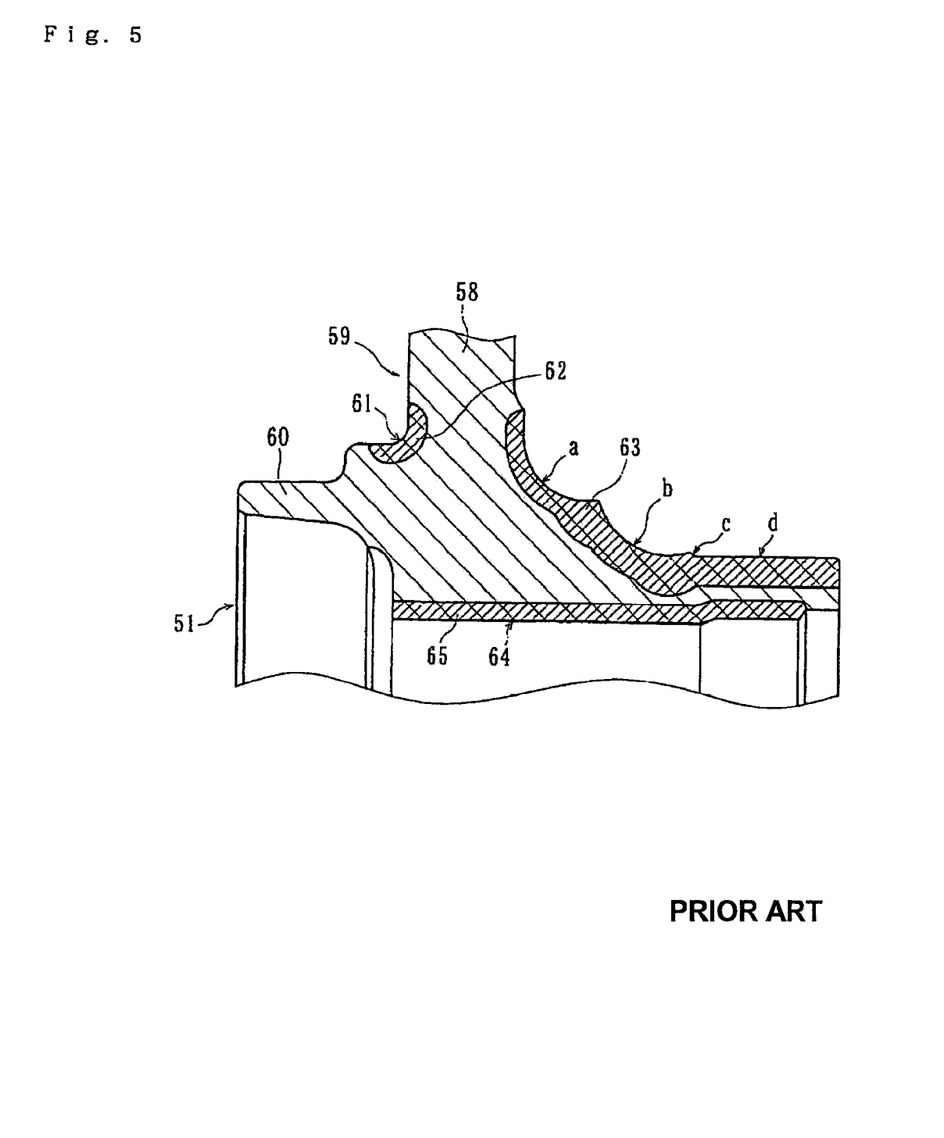
FIG. 5 is a longitudinal section view of a prior art wheel bearing apparatus.

The applicant of the present application has proposed a vehicle wheel bearing apparatus which increases the strength of the wheel hub 51 as well as reducing its weight without changing the configuration and dimension of the wheel mounting flange 58. In this bearing apparatus, as shown in FIG. 5, the corner 61 of the flange 58 of the wheel hub 51 is formed with a surface hardened layer 62. The surface hardened layer is formed by high frequency induction hardening. This strengthens the corner 61 of the flange 58 where the rotary bending strength is most weakened and thus increases the durability of the wheel hub 51.

Portions other than the corner 61, e.g. a seal land portion which slidably contacts a seal lip is fitted into the outboard side end of the outer member 55, as well as, portions "a"~"d" from the raceway surfaces to the axially extending stepped cylindrical portion of the wheel hub 51, are also formed with a surface hardened layer 63 by induction hardening. In addition a serrated portion 64 formed within the inner peripheral surface of the wheel hub 51 is formed with a surface hardened layer 65. Thus the rotary bending strength, wear resistance and rolling fatigue life required for these portions "a"~"d" can be improved (see Japanese Laid-open Patent Publication No. 87008/2002).

Although it is possible, according to the vehicle wheel bearing apparatus of the prior art, to increase the strength of the wheel hub 51 as well as to reduce its weight without changing the configuration and dimension of the wheel mounting flange 58 by forming the surface hardened layer 62 at the corner 61 of the flange 58 of the wheel hub 51, new problems are caused such that the wheel mounting flange 58 is deformed by the heat treatment in the high frequency induction hardening step. Thus, this causes a large surface run-out of the brake rotor mounting surface 59. The problem of surface run-out is also caused by the thinning of the wheel mounting flange 58. The surface run-out of the brake rotor mounting surface 59 gives influence to the run-out of the brake rotor 57. Thus, this causes a brake judder which impairs the driving stability and the driving feeling. In this case, although it is also conceivable to further cut the brake rotor mounting surface 59 by lathe cutting after heat treatment of the wheel hub 51 to modify the deformed portion so as to improve the surface run-out, there also remains the dilemma that a slight step difference is caused between the surface hardened layer 62 of the corner 61 and the unhardened brake rotor mounting surface 59 due to a difference in hardness between the two.

SUMMARY OF THE INVENTION

It is, therefore, an object of the present invention to provide a vehicle wheel bearing apparatus which can increase the strength and durability of the wheel hub under rotary bending conditions as well as reduce its weight without changing the configuration and dimension of the wheel mounting flange and without causing surface run-out.

According to an object of the present invention, a vehicle wheel bearing apparatus comprises an outer member formed with a double row outer raceway surfaces on its inner peripheral surface. An inner member is formed with a double row inner raceway surfaces arranged opposite to the double row outer raceway surfaces. Double row rolling elements are freely rollable between the outer and inner raceway surfaces, respectively, of the outer and inner members. A wheel mounting flange is integrally formed with either the outer member or the inner member. At least one of the outer and inner members have threaded apertures to receive hub bolts to secure a wheel. The wheel mounting flange is thermally refined to have a predetermined surface hardness. Also, the raceway surfaces are hardened by quenching to a predetermined surface hardness.

According to the present invention, at least one of the outer member and the inner member have threaded apertures to receive hub bolts to secure a wheel. Also, the wheel mounting flange is thermally refined to have a predetermined surface hardness. Further, the raceway surfaces are hardened by quenching to a predetermined surface hardness. Accordingly it is unnecessary to reduce the surface hardness of the region including the serrated-aperture and its neighboring portion contrary to the serrated-aperture type into which the hub bolt is press fit. Thus, it is possible, according to the bearing of the present invention, to increase the surface hardness of the whole wheel mounting flange including the threaded apertures. That is, it is possible to increase the surface hardness of the inner or outer member having the wheel mounting flange to the predetermined hardness by thermal refining so that the mechanical strength of the blank is increased to its uppermost limit. In addition, it is possible to keep a desirable life of the bearing and to increase the durability against rotary bending without changing the configuration and dimension of the wheel mounting flange as while using currently used manufacturing methods and equipment.

One side of the wheel mounting flange, to which the wheel is mounted is finished by cutting after the thermal refining. Such an arrangement enables the accuracy of the surface run-out of the wheel mounting flange to be improved after thermal refining of the wheel mounting flange, although it would be deformed by thermal refining, and thus to prevent generation of the step difference which would be otherwise caused by the finish cutting of the side surface of the wheel mounting flange.

The inner member comprises a wheel hub with the wheel mounting flange and an inner ring press fit onto the wheel hub. One of the double row outer raceway surfaces is directly formed on the outer peripheral surface of the wheel hub. The other of the double row outer raceway is formed on the outer peripheral surface of the inner ring. This makes it possible to reduce the size and weight of the bearing apparatus as well as increase the strength and durability of the thermally refined wheel hub.

The end of the inboard side of the wheel hub is plastically deformed radially outward to form a caulked portion to axially secure the inner ring relative to the wheel hub. This is so-called a self-retaining structure. Thus, it is unnecessary to control the amount of preload applied to the inner ring by fastening nuts as is usually carried out in the prior art. Thus, it is possible to obtain an ease of its assembly to a vehicle body and to maintain the amount of preload for a long term.

The surface hardness of the caulked portion is set below 25 HRC by tempering it after the thermally refining. This makes it possible to suppress hardness variation in the caulked portion as compared with portions not thermally refined after forging as in the prior art. In addition, it is possible to improve its quality by reducing micro-cracks which would be generated on the surface of the caulked portion by plastic working.

A vehicle wheel bearing apparatus comprises an outer member formed with double row outer raceway surfaces on the inner peripheral surface. An inner member is formed with double row inner raceway surfaces arranged opposite to the double row outer raceway surfaces. Double row rolling elements are freely rollable between the outer and inner raceway surfaces, respectively, of the outer and inner members. A wheel mounting flange is integrally formed with either one of the outer member or the inner member. The raceway surfaces of the outer and inner members are hardened by quenching to a predetermined surface hardness. Portions where higher bending stress is caused than in other portions, by a moment load, are partially thermally refined so that the surfaces are hardened to the lowermost hardness of the raceway surfaces hardened by quenching.

The raceway surfaces of the outer and inner members are hardened by quenching to a predetermined surface hardness. Portions where a higher bending stress is caused, than in other portions, by a moment load, are partially thermally refined so that the surfaces are hardened to the lowermost hardness of the raceway surfaces hardened by quenching. Accordingly, it is possible to keep a desirable life of the bearing and also to increase the surface hardness of the most weakened portions to about 54 HRC so that the mechanical strength of the blank is increased to its uppermost limit. In addition, it is possible to increase the durability against rotary bending without changing the configuration and dimension of the wheel mounting flange as well as while using currently used manufacturing method and equipment.

A base portion of the wheel mounting flange is partially thermally refined to a predetermined surface hardness. This makes it possible to increase the mechanical strength of the blank to its uppermost limit without reducing the accuracy of the surface run-out.

The inner member and the outer member to be thermally refined are made of medium carbon steel including carbon of 0.40~0.80 wt % by weight. This is advantageous in the case of forging, cutting, thermal refining or economy and especially in high frequency induction hardening.

One preferred embodiment of the vehicle wheel bearing apparatus of the present invention comprises an outer member formed with double row outer raceway surfaces on the inner peripheral surface. An inner member is formed with double row inner raceway surfaces arranged opposite to the double row outer raceway surfaces. Double row rolling elements are freely rollable between the outer and inner raceway surfaces, respectively, of the outer and inner members. A wheel mounting flange is integrally formed with either one of the outer or inner members. At least one of the outer or inner members have threaded apertures to receive hub bolts to secure a wheel. The wheel mounting flange is thermally refined to have a predetermined surface hardness. Also, the raceway surfaces are hardened by quenching to a predetermined surface hardness. Accordingly, it is possible to increase the surface hardness of whole wheel mounting flange including the threaded apertures. That is, it is possible to increase the surface hardness of the inner or outer member having the wheel mounting flange to the predetermined hardness by thermal refining so that the mechanical strength of the blank is increased to its uppermost limit. In addition, it is possible to keep a desirable life of the bearing and also to increase the durability against rotary bending without changing the configuration and dimension of the wheel mounting flange as well as while using currently used manufacturing methods and equipment.

Another preferred embodiment of the vehicle wheel bearing apparatus of the present invention comprises an outer member formed with double row outer raceway surfaces on its inner peripheral surface. An inner member is formed with double row inner raceway surfaces arranged opposite to the double row outer raceway surfaces. Double row rolling elements are freely rollable between the outer and inner raceway surfaces, respectively, of the outer and inner members. A wheel mounting flange is integrally formed with either one of the outer or inner members. The raceway surfaces of the outer and inner members are hardened by quenching to a predetermined surface hardness. Portions in which a higher bending stress is caused, than in other portions, by a moment load, are partially thermally refined so that there surfaces are hardened to the lowermost hardness of the raceway surfaces hardened by quenching. Accordingly it is possible to keep a desirable life of the bearing and also to increase the surface hardness of the most weakened portions to about 54 HRC so that the mechanical strength of the blank is increased to its uppermost limit. In addition, it is possible to increase the durability against rotary bending without changing the configuration and dimension of the wheel mounting flange as while using currently used manufacturing methods and equipment.

Preferably, a vehicle wheel bearing apparatus comprises an outer member formed with double row outer raceway surfaces on the inner peripheral surface. A wheel hub with a wheel mounting flange and an axially extending stepped cylindrical portion extends from the wheel mounting flange.

The wheel hub is formed, on its outer peripheral surface, with one inner raceway surface opposite to one of the double row outer raceway surfaces. An inner ring is adapted to be press-fit onto the axially extending portion of the wheel hub. The inner ring, on its outer peripheral surface, is formed with another inner raceway surface opposite to the other of the double row outer raceway surfaces. Double row rolling elements are freely rollable between the outer and inner raceway surfaces. A caulked portion is formed at the end of the inboard side of the wheel hub by plastically deforming it radially outward to axially secure the inner ring relative to the wheel hub. At least one of the outer or inner members have threaded apertures to receive hub bolts to secure a wheel. The wheel mounting flange is thermally refined to have a predetermined surface hardness. Also, the raceway surfaces are hardened by quenching to a predetermined surface hardness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
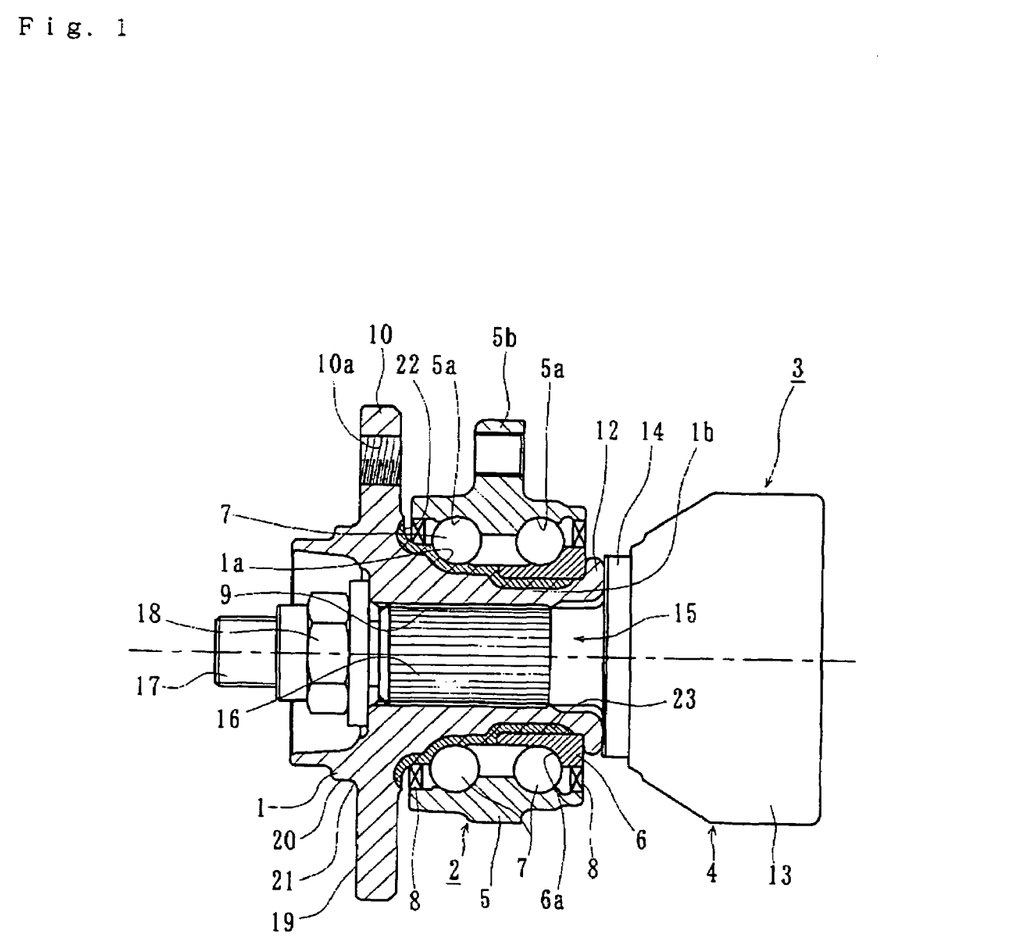
FIG. 1 is a longitudinal section view of a first embodiment of a wheel bearing apparatus of the present invention.

FIG. 1 shows a first embodiment of a vehicle bearing apparatus of vehicle of the present invention. In the description below, the term "outboard side" of the apparatus denotes a side which is positioned outside of the vehicle body and the term "inboard side" of the apparatus denotes a side which is positioned inside of the body when the bearing apparatus is mounted on the vehicle body.

The illustrated bearing apparatus is used for a driving wheel of vehicle. A vehicle wheel hub 1 and a double row rolling bearing 2 are assembled into a unit. The structure includes an outer joint member 4 of a constant velocity universal joint 3 fitted into the inner peripheral surface of the wheel hub 1, via serration engagement, so as to transmit torque.

The double row rolling bearing 2 has, as its main components, an outer member 5 with double row outer raceway surfaces 5a and 5a formed on its inner peripheral surface. A body mounting flange 5b, to be mounted on a body (not shown) of vehicle, is integrally formed on its outer peripheral surface. The wheel hub 1 has one of a double row inner raceway surfaces correspondingly opposed to the outer raceway surfaces 5a. The inner raceway surface 1a is formed directly on its outer peripheral surface. An inner ring 6 is press fit onto the axially extending stepped cylindrical portion 1b of the wheel hub 1. The inner ring 6 forms another inner raceway surface 6a. Double row rolling elements 7 and 7 are contained between the outer raceway surfaces 5a and 5a and the inner raceway surfaces 1a and 6a. The rolling elements 7 and 7 are freely rollably held by cages (not shown). Seals 8 and 8 are arranged at the ends of the double row rolling bearing 2 to prevent leak of grease contained within the bearing 2 as well as ingress of rain, water or dusts.

The wheel hub 1 is formed with a serration (or spline) 9 on its inner peripheral surface for torque transmission. The wheel hub is integrally formed with a wheel mounting flange 10 to mount a wheel and a brake rotor (not shown) on its outer peripheral surface at the outboard side. Threaded apertures 10a, receive hub bolts (not shown), to secure the wheel on the flange 10. The bolts are screwed into and arranged equidistant along the periphery of the wheel mounting flange 10.

In this bearing apparatus, a caulked portion 12 is formed by plastically deforming radially outwardly the end of the axially extending portion 1b of the wheel hub 1 after the inner ring 6 has been press fit onto the stepped portion 1b. The double row rolling bearing 2 is formed as a unit by axially securing the inner ring 6 relative to the wheel hub 1 by the caulked portion 12. Due to this united structure of the bearing apparatus, it is possible to provide a third generation vehicle wheel bearing apparatus having a so-called self-retaining structure. This structure can control the preload of the bearing 2 without using any fastening members such as a nut. The illustrated ball rolling elements 7 and 7 may be replaced for example by conical rolling elements.

The constant velocity universal joint 3 includes the outer joint member 4, an inner joint member (not shown), torque transmitting balls contained between the inner and outer joint members, and cages to hold the torque transmitting balls equidistantly along a circle. The outer joint member 4 has a cup-shaped mouth portion 13, a shoulder 14 forming the bottom of the mouth portion 13, and a stem portion 15 which axially extends from the shoulder 14. Serrations (splines) 16 are formed on the outer peripheral surface of the stem portion 15. A male thread 17 is formed on the end of the stem.

Torque can be transmitted between the outer joint member 4 and the wheel hub 1 by engaging the serrations 9 of the wheel hub 1 with the serrations 16 of the stem portion 15 by inserting the stem portion 15 into the wheel hub 1. The constant velocity universal joint 3 can be detachably secured to the double row rolling bearing 2 by fastening a nut 18 onto the threaded end 17 of the stem portion 15. The end face of the shoulder 14 abuts the caulked portion 12 of the wheel hub 1.

The wheel hub 1 is made of medium carbon steel such as S53C including carbon of 0.40~0.80 wt % by weight and formed to a predetermined configuration and dimension by lathe cutting after hot forging and then heat treated as hereinafter described. The base portion of the wheel mounting flange 10 at the outboard side has a corner 21 between the brake rotor mounting surface 19 and a pilot portion 20 which forms a supporting surface of the brake rotor (not shown). The corner 21 is formed as a circular arc (or an undercut) having a radius of curvature not causing an interference of the brake rotor.

The wheel hub 1 is thermally refined so that the material forming the wheel hub is tempered at high temperature above 400° C. After forging, this changes the metallographic structure to troostite or sorbite. The metallographic structure of the wheel hub 1 is granulated by this thermal refining and thus the ductility and toughness is increased due to increase of mechanical characteristics such as tension, bending and impact values. Since it is known that the mechanical strength can be linearly increased by increasing the surface hardness with the thermal refining, the surface hardness of the wheel hub 1 after the thermal refining is increased to 54 HRC which is a lowermost hardness of a seal land portion 22 described below. In addition, since a hub bolt (not shown), with its male thread, are adapted to be screwed into the threaded aperture 10*a* of the wheel mounting flange 10, it is unnecessary to reduce the surface hardness of the serrated aperture into which the hub bolt is press-fit to a value lower than 35 HRC. Thus, it is possible to increase the surface hardness of the whole wheel mounting flange 10 including the treaded aperture 10*a* to 54 HRC.

This strengthens the corner 21 and the seal land portion 22 of the flange where rotary bending strength is most weakened on the wheel hub 1. Thus, the strength of the wheel hub 1 is substantially increase by thermal refining the wheel hub 1. After its lathe cutting and by setting the surface hardness of the wheel hub 1 at a desired value, current methods and facility may be used without changing the configuration and dimension of the wheel mounting flange 10. After this thermal refining, it is possible to carry out the lathe cutting on the side surface 19 of the wheel mounting flange to which the brake rotor is mounted in order to correct its surface run-out. In this case, according to the present invention, since the whole surface of the wheel hub 1, including the wheel mounting flange 10, is hardened by the thermal refining, there is no worry of causing any step difference on the brake rotor mounting surface 19 after its lathe cutting due to the difference in its surface hardness.

The wheel hub 1 is formed with hardened layer 23 by high frequency induction hardening (shown by cross-hatching in drawings) with a surface hardness of 54~64 HRC. The hardened layer includes the inner raceway surface 1*a* of the outboard side, a seal land portion 22 with which a seal 8 contacts, and the axially extending stepped cylindrical portion 1*b*. Thus, the seal land portion 22, which forms the base portion of the wheel mounting flange 10, not only has an improved wear resistance but provides a large mechanical strength to the wheel hub 1 against rotary bending load applied to the wheel mounting flange 10. The inner ring 6 is made of high carbon chrome bearing steel such as SUJ 2 and is hardened to its core by dipping quenching to have a surface hardness of HRC 54~64. The surface hardness of the caulked portion 12 is set below 25 HRC after its heat treatment by tempering the caulked portion 12. This makes it possible to suppress variation in hardness of the caulked portion when compared with portions of non heat treatment as in the prior art. In addition, it is possible to improve its quality by reducing micro-cracks which would be generated by plastic working.

On the other hand, the outer member 5 is made of medium carbon steel including carbon of 0.40~0.80 wt % by weight such as S53C. The double row outer raceway surfaces 5*a* and 5*a* as well as its inner peripheral end surfaces, where the seals 8 and 8 are fitted, are hardened by high frequency induction quenching to have a surface hardness of 54~64 HRC. The outer member 5 is thermally refined by high frequency/high temperature tempering at a temperature higher than 400° C. after being formed to a desired configuration and dimension, by lathe cutting in order to increase the surface hardness to 54 HRC after the thermal refining so that the durability of the outer member 5 can be further improved due to an increase of the mechanical strength especially the strength in rotary bending.

Although it has been described in this embodiment that both the wheel hub 1 and the outer member 5 are thermally refined, it is possible to adopt a high frequency partial surface heat treatment after its lathe cutting, for example, only in the bases of the flange 10, the corner 21 and the seal land portion 22 of the wheel mounting flange 10 of the wheel hub 1, and the base of the body mounting flange 5*b* of the outer member 5. This prevents the deformation of the wheel mounting flange 10 during heat treatment. In this case, it is possible to use a hub bolt, formed with serrations, and to press-fit this into a bolt aperture formed in the wheel mounting flange 10.

Figure 2:
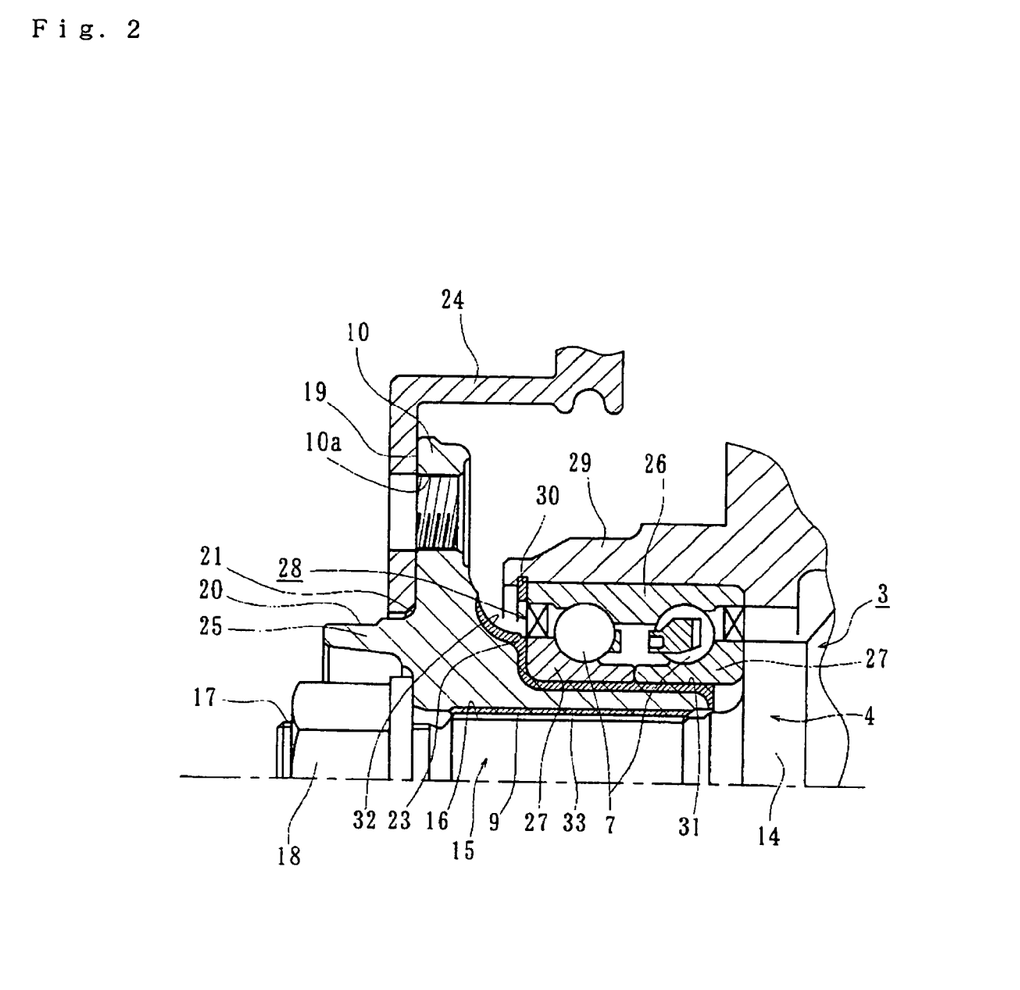
FIG. 2 is a longitudinal section view of a second embodiment of a wheel bearing apparatus of the present invention.

FIG. 2 is a longitudinal view of a second embodiment of the wheel bearing apparatus of the present invention. This embodiment shows a first generation wheel bearing apparatus. The same reference numerals are used to designate the same parts having the same functions used in the first embodiment.

The wheel bearing apparatus has, as its main components, a wheel hub 25 to secure the brake rotor 24 and a wheel (not shown), a bearing 28 having the double row rolling elements (balls) 7 and 7 freely rollable between an outer ring (outer member) 26 and the inner rings 27 and 27, a knuckle 29 to support the bearing 28 on the body of vehicle, and the constant velocity universal joint 3 connected to the wheel hub 25 to transmit power of a drive shaft (not shown) to the wheel hub 25. The inner member includes the wheel hub 25 and a pair of inner rings 27 and 27. The illustrated double angular ball bearing with the ball rolling elements 7 and 7 may be replaced for example by conical rolling elements.

The outer wheel 26 of the bearing 28 is fitted in the knuckle 29 and axially secured by a snap ring 30. On the other hand, a pair of inner ring 27 and 27 are press fit onto the axially extending cylindrical portion 31 formed on the wheel hub 25. The constant velocity universal joint 3 is detachably secured to the bearing 28 by fastening a nut on the male thread 17 formed at the end of the stem portion 15. The end of the larger diameter of the inner ring 27 of inboard side abuts to the shoulder 14 of outer joint member 4.

Similarly to the first embodiment, the wheel hub 25 is made of medium carbon steel such as S53C including carbon of 0.40~0.80 wt % by weight and thermally refined after lathe cutting by the high frequency/high temperature tempering above 400° C. in order to increase the surface hardness after the heat treatment to 54 HRC so that the strength of the corner portion 21 and a base portion 32, which are most weak in rotary bending, can be increased without changing the configuration and dimension of the wheel mounting flange 10.

The base portion 32 on the inboard side of the wheel mounting flange 10 of the wheel hub 25 has a radius of curvature as large as possible and is formed with hardened layer 23 by high frequency induction hardening (shown by cross-hatching in drawings) with a surface hardness of 54~64 HRC from the base portion 32 to the axially extending portion 31. Thus the wheel hub 25 has a sufficiently large mechanical advantage against the rotary bending load applied to the wheel mounting flange 10.

The pair of inner rings 27 and 27 are made of high carbon chrome bearing steel such as SUJ 2 and are hardened to their core by dip quenching to have a surface hardness of HRC 54~64. The provision of the predetermined hardened layer 23 makes it possible to suppress, at lowermost level, the fretting wear caused on the fitted surfaces between the axially extending portion 31 and the inner rings 27 and 27. Accordingly, generation of rust, wear or scratches which would be caused by the fretting wear at the fitted surfaces of the inner ring 27 and 27 is also prevented and thus the durability of the inner rings is improved. The surfaces of serrations 9 formed on the inner peripheral surface of the wheel hub 25 are also formed with a hardened layer 33 by high frequency induction hardening (shown by cross-hatching in drawings) with a surface hardness of 54~64 HRC. Thus the wear resistance of the serrations 9 is improved and the effective length of serrations 9 can be reduced due to its increase in strength. This contributes to reduction of size and weight of the wheel hub 25. On the other hand, the outer ring 26 is made of high carbon chrome bearing steel such as SUJ 2. It is hardened to its core by dip quenching to have a surface hardness of HRC 54~64.

Figure 3:
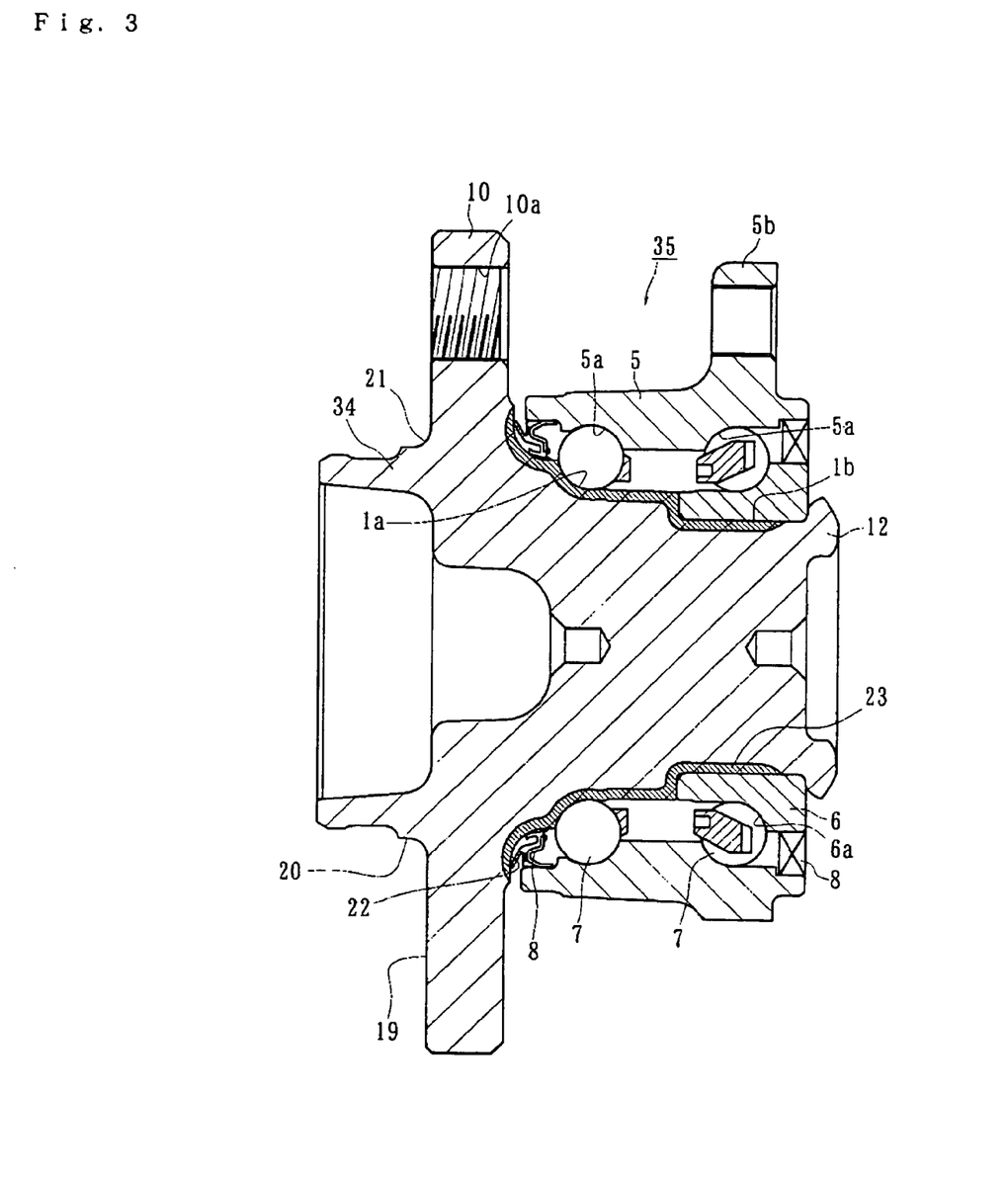
FIG. 3 is a longitudinal section view of a third embodiment of a wheel bearing apparatus of the present invention.

FIG. 3 is a longitudinal view of a third embodiment of the wheel bearing apparatus of the present invention. This embodiment shows a third generation wheel bearing apparatus. The same reference numerals are used to designate the same parts having the same functions used in the first and second embodiments.

The bearing apparatus is used for a driven wheel and has a unit construction. The wheel hub 34 and double row rolling bearing 35 are assembled as a unit. The double row rolling bearing 35 includes as its main components, the outer member 5, the wheel hub 34, the inner ring 6 press fit onto the axially extending portion 1b of the wheel hub 34, and the double row rolling elements 7 and 7. The inner member includes the wheel hub 34 and the inner ring 6.

In this bearing apparatus, a caulked portion 12 is formed by plastically deforming radially outwardly the end of the axially extending portion 1b of the wheel hub 34 after the inner ring 6 has been press fit onto the stepped portion 1b. The double row rolling bearing 35 is formed as a unit to axially secure the inner ring 6 relative to the wheel hub 34 by the caulked portion 12. Due to this united structure of the bearing apparatus, it is possible to provide a third generation vehicle wheel bearing apparatus having a so-called self-retaining structure which controls the preload of the bearing 35 without using any fasteners such as a nut.

Similarly to the first and second embodiments, the wheel hub 34 is made of medium carbon steel such as S53C including carbon of 0.40~0.80 wt % by weight. The wheel hub 34 is thermally refined after lathe cutting by the high frequency/high temperature tempering above 400° C. in order to increase the surface hardness, after the thermal refining, to 54 HRC which is the lowermost value of the surface hardness of the seal land portion 22. Thus, the strength of the corner portion 21 and the seal land portion 22, which are the most weak in rotary bearing, can be increased without changing the configuration and dimension of the wheel mounting flange 10.

The radius of curvature of the seal land portion 22 of the wheel mounting flange 10 of the wheel hub 34 is as large as possible. The hardened layer 23 (shown by cross-hatching in drawings) has a surface hardness of 54~64 HRC which is formed by high frequency induction hardening from the seal land portion 22 to the axially extending portion 1b. Thus, the seal land portion 22 has a sufficiently large mechanical advantage against rotary bending load applied to the wheel mounting flange 10. Thus, the durability of the wheel hub 34 is improved.

The inner ring 6, press-fit into the axially extending portion 1b is made of high carbon chrome bearing steel such as SUJ 2. The inner ring 6 is hardened to its core by dip quenching to have the surface hardness of HRC 54~64. The provision of the predetermined hardened layer 23 makes it possible to suppress, at lowermost level, the fretting wear caused on the fitted surfaces between the axially extending portion 1b and the inner ring 6. Thus, the durability of the inner ring 6 is improved.

Figure 4:
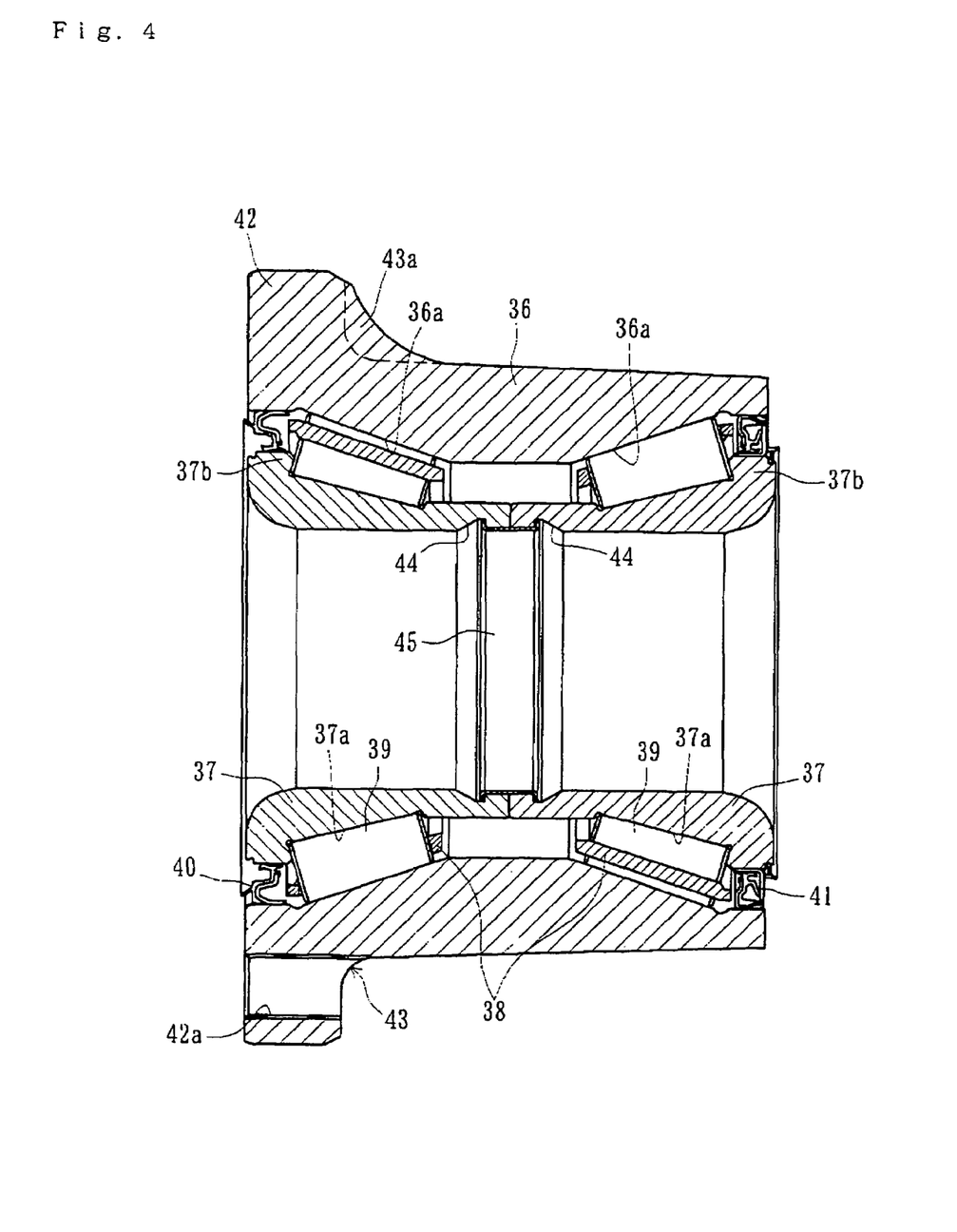
FIG. 4 is a longitudinal section view of a fourth embodiment of a wheel bearing apparatus of the present invention.

FIG. 4 is a longitudinal view of a fourth embodiment of the wheel bearing apparatus of the present invention. This embodiment shows a second generation wheel bearing apparatus. The same reference numerals are used to designate the same parts which have the same functions used in the first through third embodiments.

The bearing apparatus is used for a driven wheel. The bearing apparatus includes a wheel (outer member) hub 36 to secure a wheel (not shown), a pair of inner rings (inner member) 37 and 37, and double row rolling elements (conical rolling elements) 39 and 39 freely rollably contained by a cage 38 between the wheel hub 36 and the inner rings 37 and 37. Seals 40 and 41 are arranged at either ends of the wheel hub 36 to prevent leakage of grease contained within the bearing and immigration of rain, water or dusts from the outside into the bearing.

The wheel hub 36 is integrally formed with a wheel mounting flange 42 on its outer periphery at its outboard side. The wheel hub 36 is directly formed with double row outer raceway surfaces 36a and 36a. Each surface 36a is a tapered surface on its inner periphery. The wheel mounting flange 42 is formed with a plurality of ribs 43a on its base 43 at the inboard side in order to improve the strength of rotary bending. A plurality of threaded apertures 42a are formed on its periphery, at an equidistant, each to receive a hub bolt (not shown).

On the other hand, each inner ring 37 is formed with inner raceway surfaces 37a and 37a on its outer periphery opposite to one of the double row outer raceway surfaces 36a and 36a. The double row rolling elements 39 and 39 are contained in an annular space formed between the outer and inner raceway surfaces 36a and 37a. The rolling elements 39, 39 are supported in a freely rollable manner with guidance by flanges 37b formed on the end of the larger diameter of each inner ring 37. In addition, a connecting ring 45 made of steel having a C-shaped cross-sectional configuration is fitted in annular grooves 44 formed on each inner ring 37. This connecting ring 45 makes it possible to axially unite the pair of inner rings 37 and 37 to improve workability in assembly and disassembly of the apparatus. Also, the ring 45 makes it possible to prevent the bearing portion of the outboard side from separating from the bearing portion of the inboard side, which would remain on the fixed shaft during disassembly of the bearing unit for service.

The wheel hub 36 is made of medium carbon steel such as S53C including carbon of 0.40~0.80 wt % by weight and formed to a predetermined configuration and dimension by lathe cutting after hot forging and then heat treated. And similarly to embodiments previously described, the surface hardness after the thermal refining of the wheel hub 36 is increased to 54 HRC. Thus the durability of the wheel hub 36 can be improved due to an increase of the mechanical strength especially the strength against rotary bending in the most weak portions of the wheel hub 36, such as the base portion 43 and peripheral portion of the inboard side of the wheel mounting flange 42. In addition, the outer raceway surfaces 36a of the wheel hub 36 are formed with a hardened layer by high frequency induction having a surface hardness of 54~64 HRC. Such a hardened layer may be formed on the each inner peripheral end surface of the wheel hub 36 in which the seals 40 and 41 are fitted, if desired. On the other hand, the inner ring 37 is made of high carbon chrome bearing steel such as SUJ 2. The inner ring 37 is hardened to its core by dip quenching to have the surface hardness of HRC 54~64.

The vehicle wheel bearing apparatus of the present invention can be applied not only to those for a driving wheel and a driven wheel, those having rolling elements of balls and conical rollers, and those of inner raceway rotation type and outer raceway rotation type, but to those having integrally formed wheel mounting flange and body mounting flange.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A vehicle wheel bearing apparatus comprising:
   an outer member formed with double row outer raceway surfaces on its inner peripheral surface;
   an inner member formed with double row inner raceway surfaces arranged opposite to the double row outer raceway surfaces, the inner member further having a wheel hub;
   double row rolling elements freely rollable between the outer and inner raceway surfaces, respectively, of the outer and inner members;
   the wheel hub is formed with a wheel mounting flange having threaded apertures to receive hub bolts to secure a wheel, and said raceway surfaces are hardened by quenching to a predetermined surface hardness of 54-64 HRC;
   wherein the wheel hub of the inner member is entirely, including its surface, except for a caulking portion, if present, thermally refined after forging, changing the metallographic structure of the wheel hub to troosite or sorbite.

2. A vehicle wheel bearing apparatus of claim 1 wherein one side of the wheel mounting flange adapted to receive a mounted wheel is finished by cutting after the heat treatment.

3. A vehicle wheel bearing apparatus of claim 1 wherein the inner member comprises an inner ring press fit onto the wheel hub, and one of the double row inner raceway surfaces is directly formed on the outer peripheral surface of the wheel hub, and the other of the double row inner raceway is formed on the outer peripheral surface of the inner ring.

4. A vehicle wheel bearing apparatus of claim 3 wherein an end of the inboard side of the wheel hub is plastically deformed radially outwardly to form a caulked portion to axially secure the inner ring relative to the wheel hub.

5. A vehicle wheel bearing apparatus of claim 4 wherein the surface hardness of the caulked portion is set below 25 HRC by tempering it after the thermal refining.

6. A vehicle wheel bearing apparatus of claim 1, wherein the inner member or the outer member to be thermally refined are made of medium carbon steel including carbon of 0.40~0.80 wt % by weight.

7. A vehicle wheel bearing apparatus comprising:
   an outer member formed with double row outer raceway surfaces on its inner peripheral surface;
   an inner member formed with double row inner raceway surfaces arranged opposite to the double row outer raceway surfaces,
   double row rolling elements freely rollable between the outer and inner raceway surfaces, respectively, of the outer and inner members;
   wheel mounting flange integrally formed with either one of the outer or inner members;
   raceway surfaces of the outer and inner members are hardened by quenching to a predetermined surface hardness; and
   portions of the bearing apparatus, where a higher bending stress occurs than in other portions by a moment load, are entirely thermally refined, after forging, changing the metallographic structure of either the outer or inner member to troostite or sorbite so that the surfaces are hardened to the lowermost hardness of the raceway surfaces that are hardened to 54~64 HRC by quenching.

8. A vehicle wheel bearing apparatus of claim 7 wherein at least a base portion of the wheel mounting flange is entirely thermally refined to a predetermined surface hardness.

9. A vehicle wheel bearing apparatus of claim 8, wherein the inner member or the outer member to be thermally refined are made of medium carbon steel including carbon of 0.40~0.80 wt % by weight.

10. A vehicle wheel bearing apparatus comprising:
    an outer member formed with double row outer raceway surfaces on its inner peripheral surface;
    an inner member formed with double row inner raceway surfaces arranged opposite to the double row outer raceway surfaces, the inner member further having a wheel hub;
    double row rolling elements freely rollable between the outer and inner raceway surfaces, respectively, of the outer and inner members;
    the wheel hub is formed with a wheel mounting flange having threaded apertures to receive hub bolts to secure a wheel, and said raceway surfaces are hardened by quenching to a predetermined surface hardness of 54-64 HRC;
    wherein the wheel hub of the inner member is entirely, including its surface, except for a caulking portion, if present, thermally refined after forging, changing the metallographic structure of the wheel hub to troosite or sorbite, and
    on an outer peripheral surface on an outboard side of said wheel mounting flange, for mounting a brake rotor, is finished by cutting.

11. A vehicle wheel bearing apparatus of claim 10 wherein one side of the wheel mounting flange adapted to receive a mounted wheel is finished by cutting after the thermal refining.

12. A vehicle wheel bearing apparatus of claim 10 wherein the inner member comprises an inner ring press fit onto the wheel hub, and one of the double row inner raceway surfaces is directly formed on the outer peripheral surface of the wheel hub, and the other of the double row inner raceway is formed on the outer peripheral surface of the inner ring.

13. A vehicle wheel bearing apparatus comprising:
    an outer member formed with double row outer raceway surfaces on its inner peripheral surface;
    an inner member formed with double row inner raceway surfaces arranged opposite to the double row outer raceway surfaces,
    double row rolling elements freely rollable between the outer and inner raceway surfaces, respectively, of the outer and inner members;
    wheel mounting flange integrally formed with either one of the outer or inner members and an outer peripheral surface on an outboard side of said wheel mounting flange for mounting a brake rotor is finished by cutting;
    raceway surfaces of the outer and inner members are hardened by quenching to a predetermined surface hardness; and
    portions of the bearing apparatus, where a higher bending stress occurs than in other portions by a moment load, are entirely thermally refined, after forging, changing the metallographic structure of either the outer or inner member to troostite or sorbite so that the surfaces are hardened to the lowermost hardness of the raceway surfaces that are hardened to 54~64 HRC by quenching.

14. A vehicle wheel bearing apparatus of claim 13 wherein the entire base portion of the wheel mounting flange is thermally refined to a predetermined surface hardness.

15. A vehicle wheel bearing apparatus of claim 14, wherein the inner member or the outer member to be thermally refined are made of medium carbon steel including carbon of 0.40~0.80 wt % by weight.

* * * * *

UNITED STATES PATENT AND TRADEMARK OFFICE
CERTIFICATE OF CORRECTION

PATENT NO. : 7,695,195 B2 Page 1 of 1
APPLICATION NO. : 11/021580
DATED : April 13, 2010
INVENTOR(S) : Makoto Okasaka

It is certified that error appears in the above-identified patent and that said Letters Patent is hereby corrected as shown below:

Column 11
Claim 1, Line 26 "54-64" should be --54~64--

Column 12
Claim 10, Line 28 "54-64" should be --54~64--

Signed and Sealed this

Twenty-first Day of September, 2010

David J. Kappos
*Director of the United States Patent and Trademark Office*